United States Patent Office 2,876,126
Patented Mar. 3, 1959

2,876,126

PROCESS OF MIXING FINE AGGREGATES WITH ASPHALT

Albert Sommer, Montagnola, Switzerland, assignor to Straba Handels-Aktiengesellschaft, Zurich, Switzerland, a corporation of Switzerland No Drawing. Application April 9, 1956
Serial No. 576,800

5 Claims. (Cl. 106—281)

This invention relates to a process of preparing a flowable, synthetic asphaltic composition, such as is known as mastic.

A standard sheet asphalt composition ordinarily consists of about 75–80% of graded sand, 10–15% of mineral dust (filler) and 10–12% of bitumen. Mastics, on the other hand, can be prepared from the same ingredients but with smaller proportions (8–10% for example) of bitumen. In spite of the lower proportion of bitumen, the said mastic is flowable whereas the standard sheet asphaltic compositions have to be applied in a granular form and compacted by rollers, etc. The standard sheet asphalt even after compaction at high pressures contains a void content of about 5–9% or more whereas sheets made from mastic melts which are applied with a trowel without compaction, are substantially free from voids.

The chief drawback to the wide application of mastic compositions has been the long period of time necessary to prepare the mastic. For example, in order to prepare a mastic it is necessary to continuously cook and stir the ingredients including dust and 10–15% of bitumen for a period of 6–8 hours or more until the relatively small proportion of bitumen is completely and homogenously distributed over the solid particles of the composition. This prolonged agitation and heating step is expensive, requiring a considerable amount of labor and equipment to produce limited amounts of the mastic product. Also, the heating of the composition must be controlled so as to prevent decomposition or undue hardening of the bitumen.

Among the objects of this invention is to provide an improved process for the production of mastic compositions containing 8–15% of bitumen.

The objects of the invention are attained by providing the necessary components for the production of the mastic and either before or simultaneously with the mixing of the components expanding, gassing or foaming the said bitumen component. Thus, the bitumen is expanded to a volume which is, for example, about 4–10 times its normal volume. The foamed bitumen is thus composed of thin films of bitumen separated by gas or air bubbles. The energy and time required for obtaining a homogeneous mixture with the foamed bitumen is considerably reduced and during mixing and continued heating the gas is eliminated from the composition. As a result, the time required for the production of a mastic is decreased to a matter of 3 to 60 minutes.

The gassing or foam forming may be produced by a heating operation in the presence of air or inert gas, by incorporating gassing or foaming agents into the bitumen, by the introduction of a proportion of one or more volatile solvents into the bitumen, by treating molten bitumen with a gas under high pressure, etc. Suitable gas-forming agents which may be employed include inorganic materials such as ammonium carbonate, sodium bicarbonate etc., or organic materials such as azorsobutyrodinitrile, azodihexahydrobenzodinitrile, the combination of isocyanates with water, alcohols or carboxylic acids, etc. Foaming agents are very satisfactory when combined with or added during a heating operation.

In addition to the 8–15% of bitumen the resultant mastic comprises 25–35% of mineral dust at least 80% of which passes a 200 mesh screen, 20–30% of sand (0–3 mm. sizes) and 35–45% of larger aggregate of 3–7 mm. sizes. Said dust may comprise ground limestone dust, stone screenings, or any available dust material which is approximately as hard or harder than limestone.

The following examples illustrates the process of the invention.

*Example 1*

10% of bitumen (based on the amount of composition to be made) is melted in a jacketed kettle and rapidly stirred while air or carbon dioxide gas is introduced into the molten mass. When the bulk of the bitumen has increased about 5 times its original volume it is discharged into a blade type mixing vessel where 25–35% of hard dust filler (80% of which passes a 200 mesh screen) 20–30% of sand (0–3 mm.) and 35–45% of larger aggregate (3–7 mm.) are added. After mixing approximately 5 minutes a mastic composition is obtained.

*Example 2*

The process is conducted as in Example 1 except that approximately ½% of a gassing agent such as sodium bicarbonate is introduced during the melting and stirring of the bitumen.

*Example 3*

The process is conducted as in Example 1 except that the bitumen is melted under pressure in an autoclave while approximately 5% (based on the weight of the bitumen) of a solvent, such as benzene, or non-inflammable solvent, such as trichlorethylene, is incorporated therein. The molten bitumen containing the solvent is discharged into the blade type mixer at atmospheric pressure whereupon the sudden volatilization of the solvent causes the bitumen to expand to several times its original volume to prepare the bitumen for mixing with the solid ingredients.

It is believed that the mastic characteristics of the product are due to the fact that the expansion of the bitumen provides a multiplicity of bubbles each separated from the adjacent ones by a thin skin of the bitumen and that the extensive surface area of the bitumen produced by the multiplicity of thin skin films is able to coat each particle of the aggregate with which it is mixed. Coating of the aggregate particles breaks the bubbles and frees the gas.

In the specification and claims all proportions are proportions by weight unless otherwise specified.

The features and principles underlying the invention described above in connection with specific exemplifications will suggest to those skilled in the art many other modifications thereof. It is accordingly desired that the appended claims shall not be limited to any specific feature or details thereof.

I claim:

1. A process of preparing an asphaltic composition which is flowable under heat which comprises fine aggregates with bitumen comprising melting bitumen and expanding the molten bitumen by introducing gas bubbles therein until the volume is increased to 4 to 10 times that of the original bitumen, thereafter thoroughly mixing the expanded bitumen with fine aggregates in the proportion of approximately 8 to 15% by weight of bitumen to the total composition, and continuing the mixing until the gas bubbles are substantially completely eliminated.

2. The process as set forth in claim 1 in which said molten bitumen is beaten during the melting and expanding treatment.

3. The process as set forth in claim 1 in which a gassing agent is added to the bitumen during the melting and expanding treatment.

4. The process as set forth in claim 1 wherein said aggregate comprises 25–35% of a dust 80% of which passes a 200 mesh screen, 20–30% of sand less than 3 mm. in size and 35–45% of larger aggregate of 3–7 mm. size.

5. A process of preparing an asphaltic composition which is flowable under heat which comprises fine aggregates with bitumen comprising heating the bitumen to melt the same, expanding the molten bitumen by introducing gas bubbles therein until the volume is increased to 4 to 10 times that of the original bitumen and so that the bitumen is present in the form of thin films or membranes separated by gas bubbles, and thoroughly mixing the expanded molten bitumen with aggregates in the proportion of approximately 8 to 15% by weight of bitumen to the total composition and continuing the mixing until the gas bubbles are substantially completely eliminated whereby said bitumen membranes combine with the individual aggregate particles to form a thin bituminous film over the surface of each particle.

References Cited in the file of this patent

UNITED STATES PATENTS

| | | |
|---|---|---|
| Re. 7,319 | Lea | Sept. 26, 1876 |
| 230,151 | Sanford | July 20, 1880 |
| 1,576,045 | Greene | Mar. 9, 1926 |
| 2,080,690 | Bray et al. | May 18, 1937 |

FOREIGN PATENTS

| | | |
|---|---|---|
| 18,302 | Great Britain | Oct. 29, 1898 |